US012574319B2

(12) United States Patent
Liu et al.

(10) Patent No.: US 12,574,319 B2
(45) Date of Patent: Mar. 10, 2026

(54) PATH AWARENESS METHOD, APPARATUS, AND SYSTEM

(71) Applicant: HUAWEI TECHNOLOGIES CO., LTD., Shenzhen (CN)

(72) Inventors: Heyang Liu, Nanjing (CN); Jinfeng Yan, Nanjing (CN); Peiying Tao, Shenzhen (CN); Xianjun He, Chengdu (CN); Tingbo Hu, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/675,808

(22) Filed: May 28, 2024

(65) Prior Publication Data

US 2024/0314069 A1　Sep. 19, 2024

Related U.S. Application Data

(63) Continuation of application No. PCT/CN2022/130384, filed on Nov. 7, 2022.

(30) Foreign Application Priority Data

Nov. 29, 2021　(CN) .......................... 202111434500.2

(51) Int. Cl.
　　*H04L 45/00*　　(2022.01)
(52) U.S. Cl.
　　CPC ............ *H04L 45/566* (2013.01); *H04L 45/38* (2013.01)

(58) Field of Classification Search
　　CPC .............................. H04L 45/38; H04L 45/566
　　See application file for complete search history.

(56) References Cited

U.S. PATENT DOCUMENTS

| | | | | |
|---|---|---|---|---|
| 8,072,879 B2 * | 12/2011 | Vasseur | .................. | H04L 45/50 |
| | | | | 370/248 |
| 9,705,747 B1 * | 7/2017 | Xue | ....................... | H04L 45/125 |
| 11,711,294 B2 * | 7/2023 | Kfir | .......................... | H04L 45/22 |
| | | | | 709/238 |
| 11,973,685 B2 * | 4/2024 | Bataineh | ............... | H04L 45/745 |
| 2008/0159288 A1 * | 7/2008 | Nagarajan | ............... | H04L 45/28 |
| | | | | 370/392 |

FOREIGN PATENT DOCUMENTS

| | | |
|---|---|---|
| CN | 102946335 B | 12/2015 |
| WO | 2020098914 A1 | 5/2020 |

* cited by examiner

*Primary Examiner* — G. C. Neurauter, Jr.
(74) *Attorney, Agent, or Firm* — Slater Matsil, LLP

(57) ABSTRACT

This application provides a path awareness method and apparatus. The method includes: A source node sends, to a destination node, a first request packet that includes an identifier of a first node, an identifier of a first data flow, and first reserved information; receives a first response packet that includes the identifier of the first data flow, the identifier of the first node, and first indication information; and obtains, based on the first response packet, information indicating that a first path passes through the first node or not. The first request packet is used to request to determine whether the first path passes through the first node, the first reserved information is used to record a result about whether the first path passes through the first node.

20 Claims, 5 Drawing Sheets

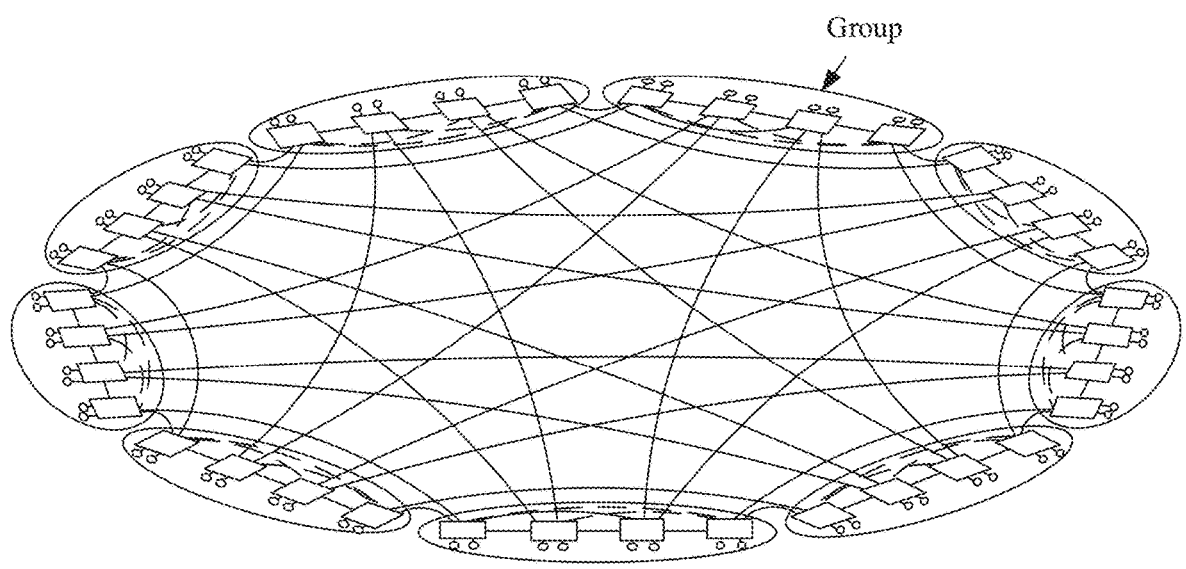
FIG. 1c
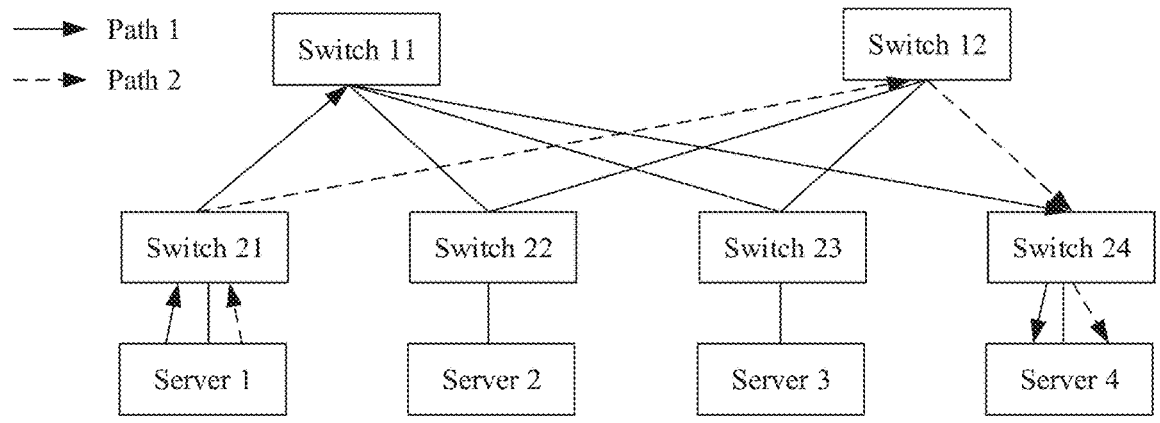
FIG. 2
| ECMP hash field | | | | | |
|---|---|---|---|---|---|
| Source IP (source IP) | Destination IP (destination IP) | Layer 4 communication protocol (layer 4 protocol) | Source port (source port) | Destination port (destination port) | Payload (payload) |
FIG. 3

PATH AWARENESS METHOD, APPARATUS, AND SYSTEM

CROSS-REFERENCE TO RELATED APPLICATIONS

This application is a continuation of International Application No. PCT/CN2022/130384 filed on Nov. 7, 2022, which claims priority to Chinese Patent Application No. 202111434500.2 filed on Nov. 29, 2021. The disclosures of the aforementioned applications are hereby incorporated by reference in their entireties.

TECHNICAL FIELD

This application relates to the communication field, and in particular, to a path awareness method, apparatus, and system.

BACKGROUND

A current data center network (data center network, DCN) includes a large quantity of servers. Servers can be interconnected through network adapters, switches, routers, cables, optical fibers, and the like, to form a hyperscale intra-group or inter-group data center network. Such a large-scale data center network becomes larger in the trend of cloud computing. Large-scale distributed services, such as high-performance computing, distributed storage, and cloud services, are based on physical infrastructures of a data center.

The distributed service is specifically characterized by a large scale and a large quantity of software systems for implementing the distributed service. Therefore, a large quantity of components are required to implement the distributed service, and a coupling relationship between components is very complex. An existing data flow path awareness solution is very complex. For example, after a source node sends a probe packet, each intermediate node that receives the probe packet needs to modify a structure of the probe packet, and add an identifier of the intermediate node to the probe packet, to indicate the intermediate node through which a path probed by the probe packet passes.

For example, an intermediate node 1 receives a probe packet, and encapsulates an identifier of the intermediate node 1 into the packet, where an encapsulated packet includes the intermediate node 1. An intermediate node 2 receives the packet forwarded by the intermediate node 1, and encapsulates an identifier of the intermediate node 2 into the packet, where an encapsulated packet includes the intermediate node 1 and the intermediate node 2. When a path passes through a large quantity of intermediate nodes, a length of the probe packet is very long. In addition, this solution depends on modification on a packet structure, and consequently, is very complex and has a very high requirement on a chip.

SUMMARY

This application provides a path awareness method, apparatus, and system, so that a packet structure does not need to be modified, and data flow path awareness can be implemented by using a simple solution.

To achieve the foregoing objective, the following technical solutions are used in this application.

According to a first aspect, a path awareness method is provided. The path awareness method is applied to a source node in a communication network. The communication network includes the source node, N intermediate nodes, and a destination node, where N is an integer greater than 0.

The path awareness method includes: sending a first request packet to the destination node, receiving a first response packet from the destination node, and obtaining first information based on the first response packet. The first request packet includes an identifier of a first node, an identifier of a first data flow, and first reserved information, the first data flow is a data flow between the source node and the destination node, the first data flow is transmitted on a first path, the first request packet is used to request to determine whether the first path passes through the first node, the first node is any one of the N intermediate nodes, and the first reserved information is used to record a result about whether the first path passes through the first node. The first response packet includes the identifier of the first data flow, the identifier of the first node, and first indication information. The first indication information is obtained by recording, in the first reserved information, the result about whether the first path passes through the first node, and the first indication information indicates that the first path passes through the first node or the first path does not pass through the first node. The first information includes that the first path passes through the first node or the first path does not pass through the first node.

Based on the path awareness method according to the first aspect, the source node sends, to the destination node, the first request packet that includes the identifier of the first node, the identifier of the first data flow, and the first reserved information; receives the first response packet that includes the identifier of the first data flow, the identifier of the first node, and the first indication information; and obtains, based on the first response packet, information indicating that the first path passes through the first node or the first path does not pass through the first node. The first data flow is transmitted on the first path, the first request packet is used to request to determine whether the first path passes through the first node, the first reserved information is used to record the result about whether the first path passes through the first node, and the first indication information is obtained by recording, in the first reserved information, the result about whether the first path passes through the first node. In this way, a structure of a packet does not need to be modified, a length of the packet does not increase, a specific characteristic of a chip is not relied on, data flow path awareness can be implemented by using a simple solution, and a requirement on a device is not high.

In addition, a path may be sensed by using a data flow. In a path awareness process, if an abnormity occurs (for example, a delay exceeds a threshold, there is no response, or an intermediate node notifies a source node of an abnormity), the path may be accurately positioned (for example, a related node and link on the path may be identified based on a topology connection relationship), so that a fault troubleshooting period is shortened. In addition, this solution is simple, and does not depend on a large amount of measurement data, and inference and analysis do not need to be performed on the data, so that overheads can be reduced.

In a possible design, the first information may further include the identifier of the first data flow and/or a delay of the first path.

In a possible design, the path awareness method provided in the first aspect may further include: determining the first path based on a topology connection relationship and second information. The topology connection relationship may include a topology relationship between the source node, the N intermediate nodes, and the destination node, the second information may be obtained by iteratively updating the first information based on the first response packet corresponding to the N intermediate nodes, the first path may include a connection relationship between Q intermediate nodes, and Q is an integer greater than 0 and less than or equal to N. In this way, intermediate nodes that the first path successively passes through can be learned of.

In a possible design, the path awareness method provided in the first aspect may further include: determining a first correlation value. The first correlation value indicates a correlation between the first request packet and a second request packet, the second request packet includes an identifier of a second data flow, the identifier of the first node, and second reserved information, the second data flow is a data flow between the source node and the destination node, the second data flow is transmitted on a second path, the second request packet is a sent packet, the second request packet is used to request to determine whether the second path passes through the first node, and the second reserved information is used to record a result about whether the second path passes through the first node. In this way, probing coverage can be improved, and overheads of probing the source node and network overheads can be reduced.

In a possible design, the sending a first request packet to the destination node may include: sending the first request packet to the destination node when the first correlation value is less than or equal to a correlation threshold. Therefore, if the correlation is high, sending may not be performed; or if the correlation is low, sending may be performed. In this way, probing coverage can be improved, and probing costs can be reduced.

In a possible design, the path awareness method provided in the first aspect may further include: generating mapping information when the first correlation value is greater than a correlation threshold. The mapping information may include a mapping relationship between the identifier of the second data flow and the identifier of the first data flow. In this way, it can be avoided that the source node constructs and sends the first request packet again, and probing costs can be reduced.

In a possible design, the path awareness method provided in the first aspect may further include: when the first path is abnormal, switching, based on correlation information and/ or abnormal node information, from communicating with the destination node through the first path to communicating with the destination node through a third path. The correlation information may indicate a correlation between each of one or more fourth paths and the first path, paths between the source node and the destination node may include the first path and the one or more fourth paths, and the abnormal node information may indicate an abnormal intermediate node. The third path is a path that is in the one or more fourth paths and that has a lowest correlation with the first path, and/or a path that is in the one or more fourth paths and that does not pass through the abnormal intermediate node. In this way, reliability of a plurality of paths between the source node and the destination node can be improved. In addition, a service flow switching speed can be improved, impact of a network fault on a service can be alleviated, and system reliability can be improved.

According to a second aspect, a path awareness method is provided. The path awareness method is applied to an intermediate node in a communication network. The communication network includes a source node, N intermediate nodes, and a destination node, where N is an integer greater than 0. The path awareness method includes: receiving a first request packet, determining whether a first path passes through a first node, and sending a third request packet.

The first request packet includes an identifier of the first node, an identifier of a first data flow, and first reserved information, the first data flow is a data flow between the source node and the destination node, the first data flow is transmitted on the first path, the first request packet is used to request to determine whether the first path passes through the first node, and the first node is any one of the N intermediate nodes. The third request packet includes the identifier of the first data flow, the identifier of the first node, and first indication information, the first indication information indicates that the first path passes through the first node or the first path does not pass through the first node, the first reserved information is used to record a result about whether the first path passes through the first node, the first indication information is obtained by recording, in the first reserved information, the result about whether the first path passes through the first node, and the first node is any one of the N intermediate nodes.

In addition, for technical effects of the path awareness method according to the second aspect, refer to the technical effects of the path awareness method according to any possible implementation of the first aspect. Details are not described herein again.

According to a third aspect, a path awareness method is provided. The path awareness method is applied to a destination node in a communication network. The communication network includes a source node, N intermediate nodes, and the destination node, where N is an integer greater than 0. The path awareness method includes: receiving a third request packet, and sending a first response packet to the source node based on an identifier of a first data flow.

The third request packet includes the identifier of the first data flow, an identifier of a first node, and first indication information, and the first indication information indicates that a first path passes through the first node or a first path does not pass through the first node. The first data flow is a data flow between the source node and the destination node, the first data flow is transmitted on the first path, and the first node is any one of the N intermediate nodes. The first response packet includes the identifier of the first data flow, the identifier of the first node, and the first indication information, and the first indication information indicates that the first path passes through the first node or the first path does not pass through the first node.

In addition, for technical effects of the path awareness method according to the third aspect, refer to the technical effects of the path awareness method according to any possible implementation of the first aspect. Details are not described herein again.

According to a fourth aspect, a path awareness apparatus is provided. The path awareness apparatus is used in a communication network including the path awareness apparatus, N intermediate nodes, and a destination node, where N is an integer greater than 0. The path awareness apparatus includes a transceiver module and a processing module.

The transceiver module is configured to send a first request packet to the destination node. The first request packet includes an identifier of a first node, an identifier of a first data flow, and first reserved information, the first data flow is a data flow between the path awareness apparatus and the destination node, the first data flow is transmitted on a first path, the first request packet is used to request to determine whether the first path passes through the first node, the first node is any one of the N intermediate nodes, and the first reserved information is used to record a result about whether the first path passes through the first node.

The transceiver module is further configured to receive a first response packet from the destination node. The first response packet includes the identifier of the first data flow, the identifier of the first node, and first indication information. The first indication information is obtained by recording, in the first reserved information, the result about whether the first path passes through the first node, and the first indication information indicates that the first path passes through the first node or the first path does not pass through the first node.

The processing module is configured to obtain first information based on the first response packet. The first information includes that the first path passes through the first node or the first path does not pass through the first node.

In a possible design, the first information may further include the identifier of the first data flow and/or a delay of the first path.

In a possible design, the processing module is further configured to determine the first path based on a topology connection relationship and second information. The topology connection relationship may include a topology relationship between the path awareness apparatus, the N intermediate nodes, and the destination node, the second information is obtained by iteratively updating the first information based on the first response packet corresponding to the N intermediate nodes, the first path may include a connection relationship between Q intermediate nodes, and Q is an integer greater than 0 and less than or equal to N.

In a possible design, the processing module is further configured to determine a first correlation value. The first correlation value indicates a correlation between the first request packet and a second request packet, the second request packet includes an identifier of a second data flow, the identifier of the first node, and second reserved information, the second data flow is a data flow between the source node and the destination node, the second data flow is transmitted on a second path, the second request packet is a sent packet, the second request packet is used to request to determine whether the second path passes through the first node, and the second reserved information is used to record a result about whether the second path passes through the first node.

In a possible design, the transceiver module is further configured to send the first request packet to the destination node when the first correlation value is less than or equal to a correlation threshold.

In a possible design, the processing module is further configured to generate mapping information when the first correlation value is greater than a correlation threshold. The mapping information may include a mapping relationship between the identifier of the second data flow and the identifier of the first data flow.

In a possible design, when the first path is abnormal, the processing module is further configured to switch, based on correlation information and/or abnormal node information, from communicating with the destination node through the first path to communicating with the destination node through a third path. The correlation information may indicate a correlation between each of one or more fourth paths and the first path, paths between the path awareness apparatus and the destination node may include the first path and the one or more fourth paths, and the abnormal node information may indicate an abnormal intermediate node. The third path is a path that is in the one or more fourth paths and that has a lowest correlation with the first path, and/or a path that is in the one or more fourth paths and that does not pass through the abnormal intermediate node.

It should be noted that the transceiver module in the fourth aspect may include a receiving module and a sending module. The receiving module is configured to receive data and/or signaling from the first node or the destination node; and the sending module is configured to send data and/or signaling to the first node or the destination node. A specific implementation of the transceiver module is not specifically limited in this application.

Optionally, the path awareness apparatus according to the fourth aspect may further include a storage module. The storage module stores a program or instructions. When the processing module executes the program or the instructions, the path awareness apparatus according to the fourth aspect can perform the method according to the first aspect.

It should be noted that the path awareness apparatus according to the fourth aspect may be a source node, for example, a server, or may be a chip (system) or another part or component that can be disposed in a source node. This is not limited in this application.

In addition, for technical effects of the path awareness apparatus according to the fourth aspect, refer to the technical effects of the path awareness method according to any possible implementation of the first aspect. Details are not described herein again.

According to a fifth aspect, a path awareness apparatus is provided. The path awareness apparatus is used in a communication network including a source node, N intermediate nodes, and a destination node, where N is an integer greater than 0. The path awareness apparatus is any one of the N intermediate nodes. The path awareness apparatus includes a transceiver module and a processing module.

The transceiver module is configured to receive a first request packet. The first request packet includes an identifier of a first node, an identifier of a first data flow, and first reserved information, the first data flow is a data flow between the source node and the destination node, the first data flow is transmitted on a first path, the first request packet is used to request to determine whether the first path passes through the first node, the first reserved information is used to record a result about whether the first path passes through the first node, and the first node is any one of the N intermediate nodes.

The processing module is configured to determine whether the first path passes through the first node.

The transceiver module is further configured to send a third request packet. The third request packet includes the identifier of the first data flow, the identifier of the first node, and first indication information, the first indication information is obtained by recording, in the first reserved information, the result about whether the first path passes through the first node, and the first indication information indicates that the first path passes through the first node or the first path does not pass through the first node.

It should be noted that the transceiver module in the fifth aspect may include a receiving module and a sending module. The receiving module is configured to receive data and/or signaling from the source node, the destination node, or another intermediate node; and the sending module is configured to send data and/or signaling to the source node, the destination node, or another intermediate node. A specific implementation of the transceiver module is not specifically limited in this application.

Optionally, the path awareness apparatus according to the fifth aspect may further include a storage module. The storage module stores a program or instructions. When the processing module executes the program or the instructions, the path awareness apparatus according to the fifth aspect can perform the method according to the second aspect.

It should be noted that the path awareness apparatus according to the fifth aspect may be an intermediate node, for example, a switch, or may be a chip (system) or another part or component that can be disposed in an intermediate node. This is not limited in this application.

In addition, for technical effects of the path awareness apparatus according to the fifth aspect, refer to the technical effects of the path awareness method according to any possible implementation of the second aspect. Details are not described herein again.

According to a sixth aspect, a path awareness apparatus is provided. The path awareness apparatus is used in a communication network including a source node, N intermediate nodes, and the path awareness apparatus, where N is an integer greater than 0. The path awareness apparatus includes a receiving module and a sending module.

The receiving module is configured to receive a third request packet. The third request packet includes an identifier of a first data flow, an identifier of a first node, and first indication information, and the first indication information indicates that a first path passes through the first node or a first path does not pass through the first node. The first data flow is a data flow between the source node and the path awareness apparatus, the first data flow is transmitted on the first path, and the first node is any one of the N intermediate nodes.

The sending module is configured to send a first response packet to the source node based on the identifier of the first data flow. The first response packet includes the identifier of the first data flow, the identifier of the first node, and the first indication information, and the first indication information indicates that the first path passes through the first node or the first path does not pass through the first node.

It should be noted that the receiving module and the sending module may be separately disposed, or may be integrated into one module, that is, a transceiver module. Specific implementations of the receiving module and the sending module are not specifically limited in this application.

Optionally, the path awareness apparatus according to the sixth aspect may further include a processing module and a storage module. The storage module stores a program or instructions. When the processing module executes the program or the instructions, the path awareness apparatus according to the sixth aspect can perform the method according to the third aspect.

It should be noted that the path awareness apparatus according to the sixth aspect may be a destination node, for example, a server, or may be a chip (system) or another part or component that can be disposed in a destination node. This is not limited in this application.

In addition, for technical effects of the path awareness apparatus according to the sixth aspect, refer to the technical effects of the path awareness method according to any possible implementation of the third aspect. Details are not described herein again.

According to a seventh aspect, a path awareness apparatus is provided. The path awareness apparatus includes a processor, the processor is coupled to a memory, and the memory is configured to store a computer program.

The processor is configured to execute the computer program stored in the memory, so that the path awareness method according to any one of the possible implementations of the first aspect to the third aspect is performed.

In a possible design, the path awareness apparatus according to the seventh aspect may further include a transceiver. The transceiver may be a transceiver circuit or an input/output port. The transceiver may be used by the path awareness apparatus to communicate with another device.

It should be noted that the input port may be configured to implement a receiving function in the first aspect to the third aspect, and the output port may be configured to implement a sending function in the first aspect to the third aspect.

In this application, the path awareness apparatus according to the seventh aspect may be a source node, an intermediate node, or a destination node, or a chip or a chip system disposed inside a source node, an intermediate node, or a destination node.

In addition, for technical effects of the path awareness apparatus according to the seventh aspect, refer to the technical effects of the path awareness method according to any implementation of the first aspect to the third aspect. Details are not described herein again.

According to an eighth aspect, a path awareness system is provided. The path awareness system includes the path awareness apparatus according to the fourth aspect, the path awareness apparatus according to the fifth aspect, and the path awareness apparatus according to the sixth aspect.

Alternatively, the path awareness system includes the path awareness apparatus according to the fourth aspect for implementing the method according to the first aspect, the path awareness apparatus according to the fifth aspect for implementing the method according to the second aspect, and the path awareness apparatus according to the sixth aspect for implementing the method according to the third aspect.

For example, the path awareness system may include a source node, N intermediate nodes, and a destination node, where N is an integer greater than 0.

According to a ninth aspect, a chip system is provided. The chip system includes a logic circuit and an input/output port. The logic circuit is configured to implement a processing function in the first aspect to the third aspect, and the input/output port is configured to implement receiving and sending functions in the first aspect to the third aspect. Specifically, the input port may be configured to implement a receiving function in the first aspect to the third aspect, and the output port may be configured to implement a sending function in the first aspect to the third aspect.

In a possible design, the chip system further includes a memory, and the memory is configured to store program instructions and data for implementing functions in the first aspect to the third aspect.

The chip system may include a chip, or may include a chip and another discrete component.

According to a tenth aspect, a computer-readable storage medium is provided. The computer-readable storage medium stores a computer program or instructions. When the computer program or the instructions is/are run on a computer, the path awareness method according to any one of the possible implementations of the first aspect to the third aspect is performed.

According to an eleventh aspect, a computer program product is provided, including a computer program or instructions. When the computer program or the instructions is/are run on a computer, the path awareness method according to any one of the possible implementations of the first aspect to the third aspect is performed.

BRIEF DESCRIPTION OF DRAWINGS

FIG. 1a to FIG. 1c are schematic diagrams of architectures of some data center networks according to an embodiment of this application;

FIG. 2 is a schematic diagram of a topology according to an embodiment of this application;

FIG. 3 is a schematic diagram of a structure of a packet according to this application;

DESCRIPTION OF EMBODIMENTS

The following describes technical solutions of this application with reference to accompanying drawings.

The technical solutions in embodiments of this application may be applied to various communication networks, for example, a data center (data center, DC) network. The data center network may be used in scenarios such as high-performance computing, high-performance distributed storage, big data, and artificial intelligence.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

Figure 1A:
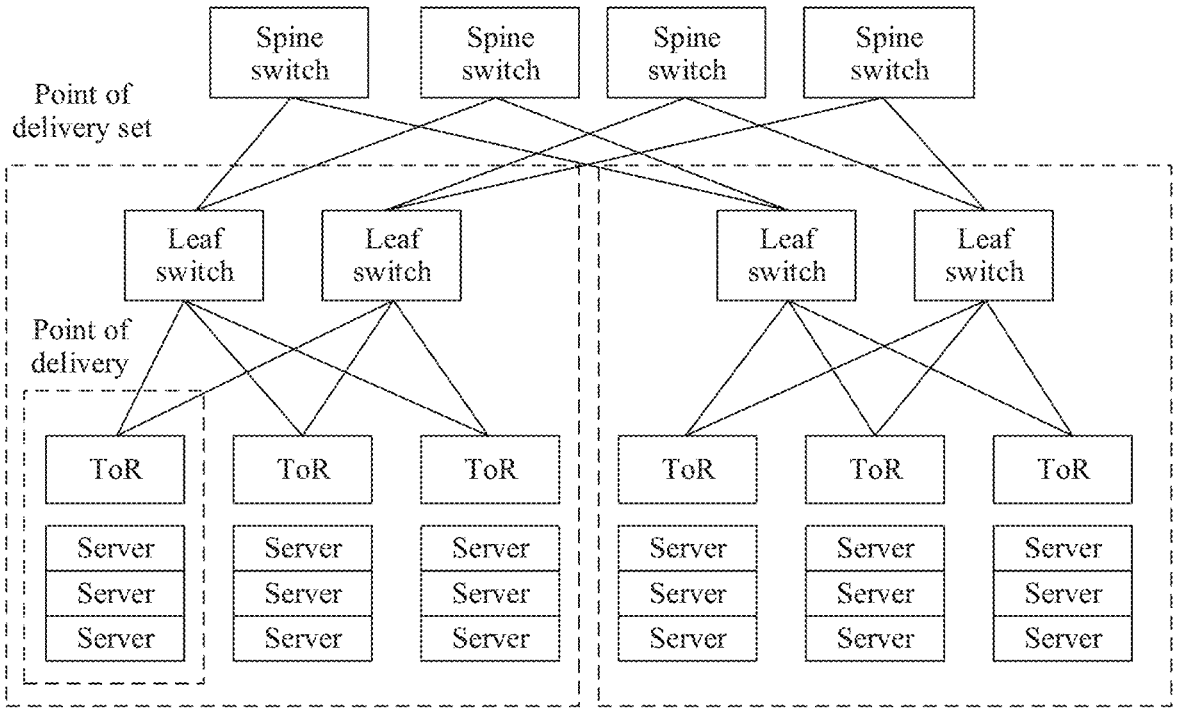
Figure 1B:
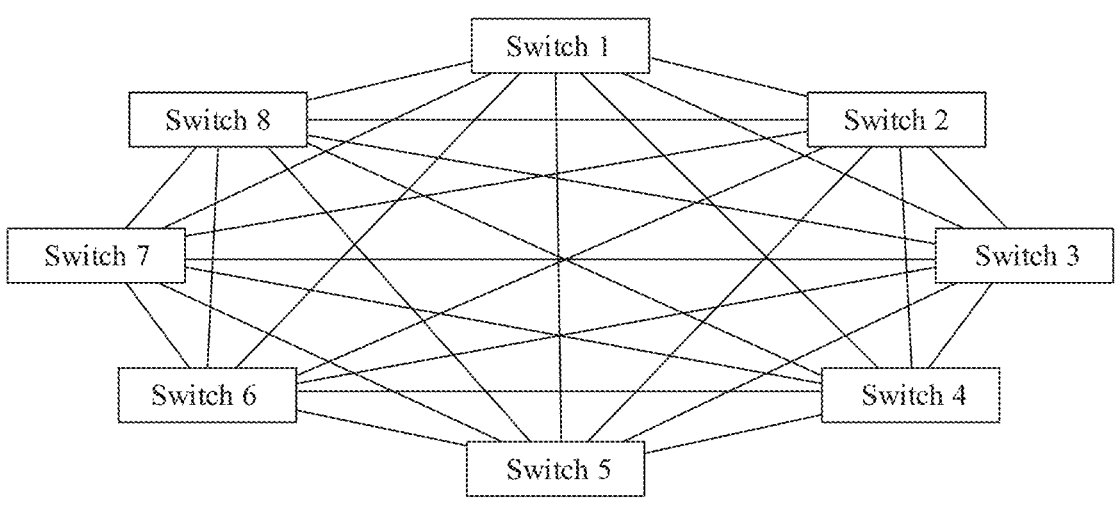

For ease of understanding of embodiments of this application, a data center network applicable to embodiments of this application is first described in detail by using data center networks shown in FIG. 1a to FIG. 1c as examples. For example, FIG. 1a to FIG. 1c are schematic diagrams of architectures of several data center networks to which a path awareness method is applicable according to an embodiment of this application.

FIG. 1a is a schematic diagram of an architecture of a data center network of a large-scale Clos (CLOS) network architecture. The data center network may include a server, a switch, a storage device, a computing network, a storage network, and the like. Switches may be classified into a top of rack (top of rack, ToR) switch, a leaf (leaf) switch, a spine (spine) switch, and the like. The top of rack switch is a switch directly connected to a server. A point of delivery (point of delivery, POD) is a basic deployment unit of the data center network. To facilitate a resource pooling operation in the data center network, resources in the entire data center network may be classified into one or more physical partitions. Each physical partition is one POD, and one physical device can belong to only one POD. One or more PODs and leaf switches form a point of delivery set. One or more point of delivery sets form the data center network.

FIG. 1b is a schematic diagram of an architecture of a data center network with a mesh (mesh) topology. All nodes (for example, switches or network devices) in the data center network are connected to each other, each switch is connected to at least two other switches, and all the switches form an entire network. After networking is performed on routers that support a mesh function, a mesh network can be generated. Hybrid networking can be performed on different access points in a star mode, a tree mode, a serial mode, and a bus mode.

FIG. 1c is a schematic diagram of an architecture of a data center network with a dragonfly (dragonfly) topology. The dragonfly topology is a two-level hierarchical network, and any topology can be used within or between groups of the dragonfly topology. Therefore, a quantity of global hops is small, a delay is low, and a network scale is easier to expand.

It should be noted that the path awareness method provided in embodiments of this application is applicable to the data center networks shown in FIG. 1a to FIG. 1c, and may be further applied to a data center network using another topology structure. FIG. 1a to FIG. 1c are merely schematic diagrams of several architectures of a data center network according to this application.

It should be understood that FIG. 1a to FIG. 1c are merely simplified schematic diagrams of examples for ease of understanding. The data center network may further include another network device and/or another device, which are/is not shown in FIG. 1a to FIG. 1c.

To make embodiments of this application clearer, the following uniformly describes some content and concepts related to embodiments of this application.

1. Path

A typical characteristic of a data center network is multipath, which can mainly ensure network reliability and traffic load balancing. As shown in FIG. 2, there are two paths between a server 1 and a server 4, for example, a path 1 and a path 2. Traffic between two servers may be distributed on different paths. For example, the path 1 between the server 1 and the server 4 sequentially includes a switch 21, a switch 11, and a switch 24, and the path 2 between the server 1 and the server 4 sequentially includes the switch 21, a switch 12, and the switch 24.

2. Hash Key (HASH Key)

The hash key may be used to select a path. After obtaining a packet, a node may obtain a hash key in the packet, and learn of a next hop and an interface by using a hash algorithm, to select a path from a plurality of paths.

FIG. 3 is a schematic diagram of a structure of a packet according to this application.

As shown in FIG. 3, the packet may include an equal-cost multipath routing (equal-cost multipath routing, ECMP) hash field (HASH fields) and a payload (payload) field.

With reference to FIG. 3, the equal-cost multipath routing hash field may include a source IP (source IP), a destination IP (destination IP), a layer 4 communication protocol (layer 4 protocol), a source port (source port), and a destination port (destination port). The equal-cost multipath routing hash field may include a source MAC (media access control, MAC) and a destination MAC. The payload refers to data actually transmitted in the packet.

It should be noted that FIG. 3 is merely an example provided in this application, and does not limit a packet format in this application.

The following specifically describes the path awareness method in embodiments of this application with reference to FIG. 4 to FIG. 7. A communication network includes a source node, N intermediate nodes, and a destination node, where N is an integer greater than 0. The source node and the destination node each may be a server. With reference to FIG. 2, the source node may be any one of the server 1 to the server 4, and the destination node may be any one of the server 1 to the server 4. For example, in a storage scenario, the source node and the destination node each may be a storage service node, including a storage client, a storage controller, a storage array, and the like. The intermediate node may be a switch, a router, or the like. With reference to FIG. 2, the N intermediate nodes may include one or more of the following: the switch 21 to the switch 24, and the switch 11 and the switch 12.

Figure 4:
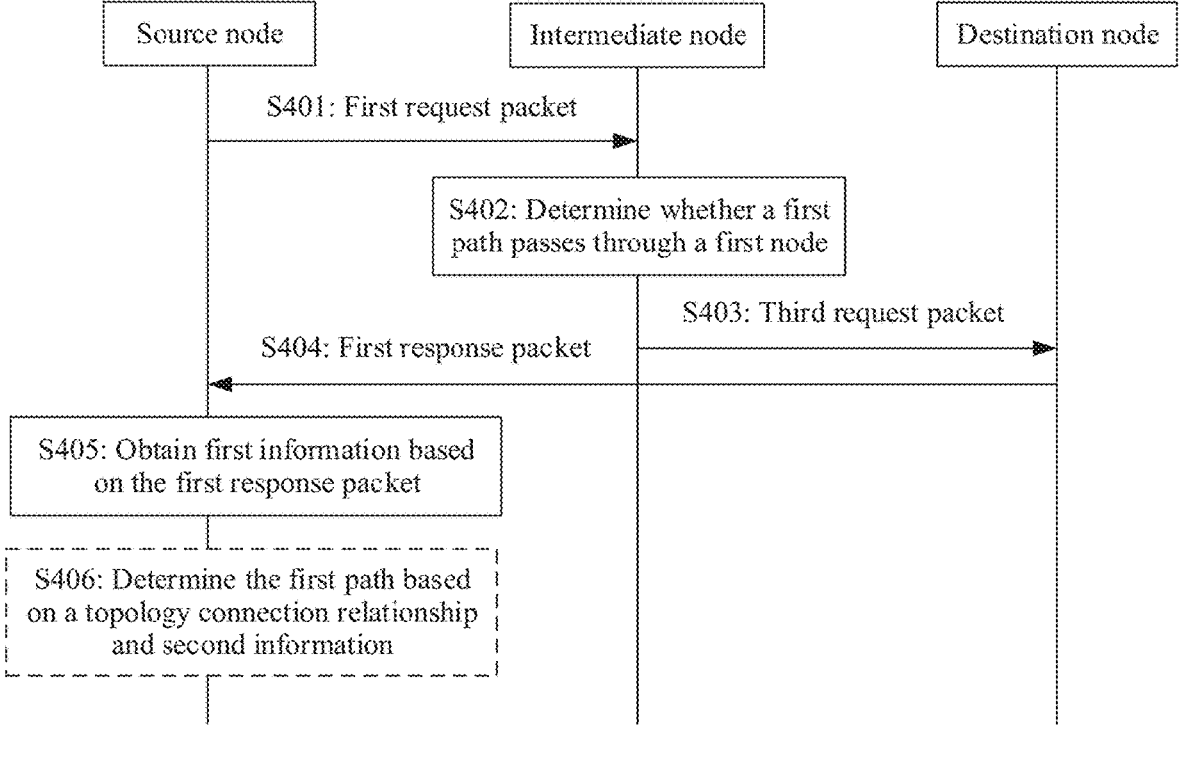
FIG. 4 is a schematic flowchart of a path awareness method according to an embodiment of this application.

For example, FIG. 4 is a schematic flowchart of a path awareness method according to an embodiment of this application.

As shown in FIG. 4, the path awareness method includes the following steps.

S401: A source node sends a first request packet to a destination node. Correspondingly, an intermediate node receives the first request packet.

For example, the first request packet may include an identifier of a first node, an identifier of a first data flow, and first reserved information.

For example, the first node is any one of N intermediate nodes. With reference to FIG. 2, if the first node is the switch 21, the identifier of the first node is 21, switch 21, and/or a device number corresponding to the switch 21.

Optionally, the identifier of the first node may be encapsulated in a payload of the first request packet. For example, a structure of the first request packet may be shown in FIG. 3.

For example, the first data flow is a data flow between the source node and the destination node. For example, with reference to FIG. 2, the first data flow may be a data flow between the server 1 and the server 4, and the destination node may be the server 4.

In some embodiments, the identifier of the first data flow may include an internet protocol (internet protocol, IP) address of the source node, a first port of the destination node, and an IP address of the destination node.

Optionally, the identifier of the first data flow may further include one or more of the following: a port of the source node, a protocol field, a media access control (media access control, MAC) address of the source node, and a MAC address of the destination node.

For example, the identifier of the first data flow may be a 1-tuple, a 2-tuple, a 4-tuple, a 5-tuple, a 7-tuple, or the like.

Optionally, the first data flow is transmitted on a first path. With reference to FIG. 2, the first path may be the path 1 or the path 2.

For example, the first request packet may be used to request to determine whether the first path passes through the first node.

For example, the first reserved information may be used to record a result about whether the first path passes through the first node.

For example, the first reserved information may occupy one or more bit locations. If a length of the first reserved information is 1 bit, an initial value of the first reserved information may be "0" or "1".

For example, "1" indicates that the first path passes through the first node, "0" indicates that the first path does not pass through the first node, the initial value of the first reserved information is "0", and it is considered by default that the first path does not pass through the first node.

For example, the initial value of the first reserved information is "0". When the intermediate node receives the first request packet and determines that the first path passes through the first node, the intermediate node may set the value of the first reserved information to "1", to indicate that the first path passes through the first node; or otherwise, the intermediate node may not perform an operation on the first reserved information, where when the value of the first reserved information is "0", it indicates that the first path does not pass through the first node.

It should be noted that "1" may alternatively indicate that the first path does not pass through the first node, and "0" may alternatively indicate that the first path passes through the first node. This is not limited in this application. In this application, an example in which "1" indicates that the first path passes through the first node and "0" indicates that the first path does not pass through the first node is used for description.

With reference to FIG. 2, an example in which the first node is the switch 21 and the first path is the path 1 is used. The first request packet may be used to request to determine whether the path 1 passes through the switch 21, and a mark is set at a specific location (for example, a location of the first reserved information) of the first request packet, to indicate that the first path passes through the first node or the first path does not pass through the first node. For example, if the switch 21 receives the first request packet, and determines that the path 1 passes through the switch 21, the switch 21 sets "0" in the first reserved information to "1". The switch 21 continues to forward the first request packet to the switch 11, and the switch 11 may determine whether the path 1 passes through the switch 21. Alternatively, when the switch 11 finds that the first reserved information is set to "1", the switch 11 does not perform determining. The switch 11 continues to forward the first request packet to the switch 24. For an action of the switch 24, refer to the switch 11. Details are not described herein again.

In this way, after the intermediate node receives the first request packet, the packet can carry information indicating whether the first path passes through the first node, without modifying a structure of the packet or increasing a length of the packet. This solution is simple.

Optionally, the first request packet may be a probe packet, a heartbeat packet, or the like.

S402: The intermediate node determines whether the first path passes through the first node.

Optionally, the intermediate node may determine, based on whether an identifier of the intermediate node matches the identifier of the first node in the first request packet, whether the first path passes through the first node.

For example, if the identifier of the intermediate node matches the identifier of the first node, it is determined that the first path passes through the first node; or if the identifier of the intermediate node does not match the identifier of the first node, it is determined that the first path does not pass through the first node.

"Match" may mean that the identifiers are the same, the identifiers have a correspondence, the identifiers have a mapping relationship, or the like. For example, an identifier of the switch 11 may be switch 11, switch-11, or the like. Switch 11 is the same as switch 11, and switch 11 and switch-11 have a correspondence or a mapping relationship.

For example, the intermediate node identifies the first request packet, detects whether the identifier of the intermediate node matches the identifier of the first node in the first request packet, and marks "passing through" if the identifier of the intermediate node matches the identifier of the first node in the first request packet.

For example, it is assumed that the first reserved information is "0", indicating that the first path does not pass through the first node. If it is determined that the identifiers match, "0" is set to "1", indicating that the first path passes through the first node. If it is determined that the identifiers do not match, no operation is performed on "0".

S403: The intermediate node sends a third request packet. Correspondingly, the destination node receives the third request packet.

For example, the third request packet may include the identifier of the first data flow, the identifier of the first node, and first indication information.

Optionally, the first indication information is obtained by recording, by the intermediate node in the first reserved information, the result about whether the first path passes through the first node, and the first indication information may indicate that the first path passes through the first node or the first path does not pass through the first node.

For example, when the intermediate node determines that the first path passes through the first node, the intermediate node records the result in the first reserved information. For example, the initial value of the first reserved information is "0", and the intermediate node sets the value of the first reserved information to "1", to obtain the first indication information, indicating that the first path passes through the first node. When the intermediate node determines that the first path does not pass through the first node, for example, the initial value of the first reserved information is "0", the intermediate node may not perform an operation on the first reserved information, to obtain the first indication information, indicating that the first path does not pass through the first node.

It should be noted that a name of the first reserved information and a name of the first indication information are not limited in this application, provided that the source node can reserve a specific bit location in the first request packet and the specific bit location can indicate whether the first path passes through the first node.

Optionally, when the first indication information indicates that the first path passes through the first node, the first indication information may occupy a differentiated services code point (differentiated services code point, DSCP) field of the third request packet.

In some embodiments, the intermediate node may continue to forward the third request packet, the third request packet may be forwarded by one or more other intermediate nodes, and the destination node finally receives the third request packet.

With reference to FIG. 2, it is assumed that the first path is the path 1, the path 1 includes switch 21-switch 11-switch 24, and the identifier of the first node is the identifier, for example, switch 11, of the switch 11. The first request packet sent by the server 1 includes switch 11, data flow 1, and "0", data flow 1 is corresponding to the path 1, and the first request packet is used to request to determine whether the path 1 passes through the switch 11. The switch 21 receives the first request packet, determines that an identifier of the switch 21 is different from switch 11, does not perform an operation on "0", and continues to forward the first request packet to the switch 11. If the switch 11 determines that the identifier of the switch 11 is the same as switch 11, the switch 11 changes "0" to "1", to indicate that the path 1 passes through the switch 11. The switch 11 forwards, to the switch 24, a packet including switch 11, data flow 1, and "1". The switch 24 determines that an identifier of the switch 24 is different from switch 11, or after finding "1", the switch 24 does not determine whether an identifier of the switch 24 is the same as switch 11, and continues to forward, to the server 4, the packet including switch 11, data flow 1, and "1".

S404: The destination node sends a first response packet to the source node based on the identifier of the first data flow. Correspondingly, the source node receives the first response packet from the destination node.

For example, the first response packet includes the identifier of the first data flow, the identifier of the first node, and the first indication information.

Optionally, the destination node may encapsulate the identifier of the first data flow, the identifier of the first node, and/or the first indication information into a payload of the first response packet. For example, a structure of the first response packet may be shown in FIG. 3.

It should be noted that, in this application, a structure of a packet is not limited to the structure shown in FIG. 3. The identifier of the first data flow, the identifier of the first node, and/or the first reserved information may be encapsulated into another field (a field other than a payload). Similarly, the identifier of the first data flow, the identifier of the first node, and/or the first indication information may be encapsulated into another field.

S405: The source node obtains first information based on the first response packet.

For example, the first information may include that the first path passes through the first node or the first path does not pass through the first node.

Optionally, the first information may further include the identifier of the first data flow and/or a delay of the first path.

In other words, the source node may record information about the first path, and may further record the identifier of the first data flow and/or the delay of the first path.

For example, the source node updates the information about the first path based on the identifier of the first data flow, the identifier of the first node, and the first indication information that are in the first response packet.

In some embodiments, the source node traverses the N intermediate nodes, and performs S401 to generate a first request packet corresponding to each of the N intermediate nodes. Each intermediate node performs S402 and S403, and the corresponding destination node performs S404, so that the source node obtains first information corresponding to each of the N intermediate nodes. The source node iteratively updates the first information to obtain second information.

For example, with reference to FIG. 2, that the first path is the path 1 and the identifier of the first data flow is data flow 1 is used as an example. The N intermediate nodes include the switch 21 to the switch 24, and the switch 11 and the switch 12. The source node sends a first request packet corresponding to the switch 21, and the first request packet corresponding to the switch 21 includes switch 21, data flow 1, and first reserved information. The switch 21 receives the first request packet, determines that the path 1 passes through the switch 21, and sends a third request packet. The third request packet includes data flow 1, switch 21, and first indication information (indicating that the path 1 passes through the switch 21). After the third request packet is sequentially forwarded by the switch 11 and the switch 24, the destination node receives the third request packet, and sends content of the third request packet to the source node. Information (which may be referred to as first information) about the first path (path 1) that is obtained by the source node includes that the path 1 passes through the switch 21, and data flow 1 and/or a delay 21 of the path 1 may be further obtained.

The source node sends a first request packet corresponding to the switch 22, and the first request packet corresponding to the switch 22 includes switch 22, data flow 1, and first reserved information. The first request packet may be sequentially forwarded by the switch 21, the switch 11, and the switch 24 to the destination node. If the switch 21, the switch 11, and the switch 24 all determine that identifiers of the switch 21, the switch 11, and the switch 24 are different from switch 22, it is determined that the path 1 does not pass through the switch 22. A third request packet received by the destination node includes data flow 1, switch 22, and first indication information (indicating that the path 1 does not pass through the switch 22), and content of the third request packet is sent to the source node. Information (which may be referred to as first information) about the first path that is obtained by the source node includes that the path 1 does not pass through the switch 22, and data flow 1 and/or a delay 22 of the path 1 may be further obtained.

The source node updates the information about the first path, obtains path information indicating that the path 1 passes through the switch 21 and the path 1 does not pass through the switch 22, and may further obtain data flow 1, the delay 21 of the path 1, and the delay 22 of the path 1.

Similarly, the switch 23 and the switch 24, and the switch 11 and the switch 12 are traversed, the source node iteratively updates the first information, and obtained final information (which may be referred to as second information) about the first path includes that the path 1 passes through the switch 21, the path 1 does not pass through the switch 22, the path 1 does not pass through the switch 23, the path 1 passes through the switch 24, the path 1 passes through the switch 11, and the path 1 does not pass through the switch 12, and may further include data flow 1, the delay 21 of the path 1, the delay 22 of the path 1, a delay 23 of the path 1, a delay 24 of the path 1, a delay 11 of the path 1, and a delay 12 of the path 1.

In a possible design, the path awareness method provided in this application may further include S406: The source node determines the first path based on a topology connection relationship and second information.

Optionally, the second information may be obtained by iteratively updating the first information based on the first response packet corresponding to the N intermediate nodes.

For details, refer to the description of the second information with reference to FIG. 2 above. Details are not described herein again.

Optionally, the topology connection relationship may include a topology relationship between the source node, the N intermediate nodes, and the destination node.

With reference to FIG. 2, the topology connection relationship may include a topology relationship between the server 1 to the server 4, the switch 21 to the switch 24, and the switch 11 and the switch 12.

Optionally, the first path may include a connection relationship between Q intermediate nodes, and Q is an integer greater than 0 and less than or equal to N.

With reference to FIG. 2, when the first path is the path 1, the second information includes that the path 1 passes through the switch 21, the path 1 does not pass through the switch 22, the path 1 does not pass through the switch 23, the path 1 passes through the switch 24, the path 1 passes through the switch 11, and the path 1 does not pass through the switch 12. The source node determines, based on the topology connection relationship and the second information, that the path 1 sequentially includes the switch 21, the switch 11, and the switch 24, and the path 1 is a link that sequentially includes the switch 21, the switch 11, and the switch 24.

Optionally, the source node may further obtain delay information of the path 1. For example, an average value of the delay 21 of the path 1, the delay 22 of the path 1, the delay 23 of the path 1, the delay 24 of the path 1, the delay 11 of the path 1, and the delay 12 of the path 1 is used as a delay of the path 1.

Optionally, whether the first path is abnormal may be identified based on the delay of the first path. For example, if a value of the delay of the first path is greater than a delay threshold, the first path is abnormal; or if a value of the delay of the first path is not greater than a delay threshold, the first path is normal.

It should be noted that, when the first path is the path 2 in FIG. 2, for a specific implementation in which the source node obtains information about the path 2, refer to the foregoing specific implementation in which the information about the path 1 is obtained. Details are not described herein again.

Based on the path awareness method shown in FIG. 4, the source node sends, to the destination node, the first request packet including the identifier of the first node, the identifier of the first data flow, and the first reserved information, where the first data flow is transmitted on the first path, and the first request packet is used to request to determine whether the first path passes through the first node; receives the first response packet including the identifier of the first data flow, the identifier of the first node, and the first indication information; and obtains, based on the first response packet, the information indicating that the first path passes through the first node or the first path does not pass through the first node. This solution is simple, a structure of a packet does not need to be modified, a length of the packet does not increase, path awareness can be implemented by using a simple solution, and a requirement on a device is not high.

In addition, a path may be sensed by using a data flow. In a path awareness process, if an abnormity occurs (for example, a delay exceeds a threshold, there is no response, or an intermediate node notifies a source node of an abnormity), the path may be accurately positioned (for example, a related node and link on the path may be identified based on a topology connection relationship), so that a fault troubleshooting period is shortened. In addition, this solution is simple, and does not depend on a large amount of measurement data, so that overheads can be reduced.

Figure 5:
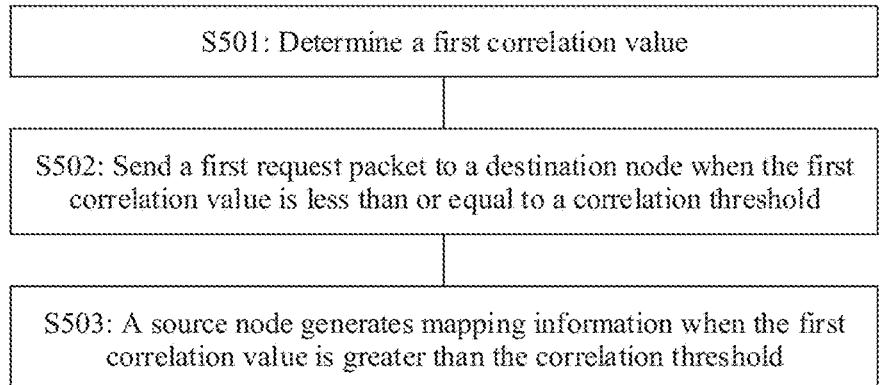
FIG. 5 is a schematic flowchart of another path awareness method according to an embodiment of this application.

For example, FIG. 5 is a schematic flowchart of another path awareness method according to an embodiment of this application. The path awareness method shown in FIG. 5 may be used in combination with the path awareness method shown in FIG. 4, or may be used independently.

As shown in FIG. 5, the path awareness method includes the following steps.

S501: A source node determines a first correlation value.

Optionally, the first correlation value may indicate a correlation between a first request packet and a second request packet.

For example, the second request packet may include an identifier of a second data flow, an identifier of a first node, and second reserved information, the second data flow may be a data flow between the source node and a destination node, the second data flow is transmitted on a second path, the second request packet may be a sent packet, and the second request packet may be used to request to determine whether the second path passes through the first node.

For example, the second reserved information may be used to record a result about whether the second path passes through the first node. For a specific implementation of the second reserved information, refer to the specific implementation of the first reserved information in S401. Details are not described herein again.

For example, the first request packet may be a packet to be sent. For a specific implementation of the first request packet, refer to S401. Details are not described herein again.

With reference to FIG. 2 and Table 1, it is assumed that the second path is the path 2 shown in FIG. 2, the path 2 includes switch 21-switch 12-switch 24, and the second request packet is a packet 2 shown in Table 1. The first request packet may be any one of a packet 1 and a packet 3 to a packet 5 in Table 1. For a path 1 and a path 3 to a path 5, refer to Table 1.

As shown in Table 1, a correlation between the packet 1 and the packet 2 is 1, a correlation between the packet 3 and the packet 2 is 3, a correlation between the packet 4 and the packet 2 is 0, and a correlation between the packet 5 and the packet 2 is 2. In other words, a correlation between the path 1 and the path 2 is 1, a correlation between the path 3 and the path 2 is 3, a correlation between the path 4 and the path 2 is 0, and a correlation between the path 5 and the path 2 is 2.

TABLE 1

|  | Packet | First correlation value |
| --- | --- | --- |
| Packet 2 | 21-12-24 (path 2) | Null |
| Packet 1 | 21-11-24 (path 1) | 1 |
| Packet 3 | 21-12-24 (path 3) | 3 |
| Packet 4 | 22-12-23 (path 4) | 0 |
| Packet 5 | 21-12-23 (path 5) | 2 |

S502: The source node sends the first request packet to the destination node when the first correlation value is less than or equal to a correlation threshold.

Optionally, the correlation threshold may be preset.

In some embodiments, if the correlation between the first request packet and the second request packet is higher, the first correlation value is larger, and the first request packet and the second request packet (or a first path and the second path) are closer, more similar, or even the same.

With reference to Table 1, for example, the correlation threshold is 3. If the first request packet is the packet 1, the first correlation value 1 is less than the correlation threshold 3. In this case, the source node sends the packet 1 to the destination node. If the first request packet is the packet 3, the first correlation value 3 is equal to the correlation threshold 3, and the packet 3 is the same as the packet 2. In this case, the source node does not send the packet 3, and may perform the following S503. Similarly, when the first request packet is the packet 4 and the packet 5, the source node determines, in a similar manner, whether to send a corresponding packet.

Therefore, whether to send a packet to be sent currently is determined based on the correlation threshold. If the correlation is high, sending may not be performed; or if the correlation is low, sending may be performed. In this way, probing coverage can be improved, and probing costs can be reduced. The concept of the method shown in FIG. 5 may be further applied to a path establishment scenario. Whether to establish a to-be-established path is determined based on a relationship between the to-be-established path and an existing path. If the correlation is high, establishment may not be performed; or if the correlation is low, establishment may be performed. In this way, reliability of a path between nodes can be improved.

When the method is used in combination with FIG. 4, S401 of sending the first request packet to the destination node in FIG. 4 may include S502: The source node sends the first request packet to the destination node when the first correlation value is less than or equal to the correlation threshold.

S503: The source node generates mapping information when the first correlation value is greater than the correlation threshold.

Optionally, the mapping information may include a mapping relationship between the identifier of the second data flow and the identifier of the first data flow.

With reference to Table 1, the mapping information may include a mapping relationship between the packet 2 and the packet 3 (or the path 2 and the path 3). The source node may no longer construct the packet 3 (or the path 3) based on the mapping information. In this way, it can be avoided that the source node constructs and sends the first request packet again, and probing costs can be reduced. In a path establishment scenario, it can be avoided that the source node establishes a path again, so that overheads can be reduced.

It should be noted that, S503 may be optional. When the first correlation value is greater than the correlation threshold, the source node may not send the first request packet, and may further generate and record the mapping information.

Optionally, when the first correlation value is greater than the correlation threshold, the source node may not establish the path, and may not send a probe packet, detected data, service data, application data, and the like by using an identifier of a data flow corresponding to the path.

In some embodiments, the source node may construct a new first request packet again, to improve probing coverage.

Based on the path awareness method shown in FIG. 5, the source node determines the correlation between the first request packet and the second request packet, where the second request packet is a sent packet; and when the first correlation value is less than or equal to the correlation threshold, sends the first request packet to the destination node; or when the first correlation value is greater than the correlation threshold, does not send the first request packet.

In this way, probing coverage can be improved, and overheads of probing the source node and network overheads can be reduced.

In a possible design, the method provided in this embodiment of this application may include: When the first path is abnormal, the source node switches, based on correlation information and/or abnormal node information, from communicating with the destination node through the first path to communicating with the destination node through a third path. This solution may be used in combination with FIG. 4, may be used in combination with FIG. 5, may be used in combination with FIG. 4 and FIG. 5, or may be used independently.

Optionally, the correlation information may indicate a correlation between each of one or more fourth paths and the first path.

Optionally, the abnormal node information may indicate an abnormal intermediate node. For example, it is assumed that the path 1 includes switch 1-switch 2-switch 3, where the switch 2 is abnormal.

For example, paths between the source node and the destination node may include the first path and the one or more fourth paths. For example, the paths between the source node and the destination node include a path 1, a path 2, a path 3, and a path 4.

In some embodiments, the third path is a path that is in the one or more fourth paths and that has a lowest correlation with the first path, and/or the third path is a path that is in the one or more fourth paths and that does not pass through the abnormal intermediate node.

For example, it is assumed that the first path is the path 1, the source node and the destination node currently communicate with each other through the path 1, the one or more fourth paths include the path 2, the path 3, and the path 4, and the correlation information may include a correlation (for example, a value is 2) between the path 2 and the path 1, a correlation (for example, 1) between the path 3 and the path 1, and a correlation (for example, 2) between the path 4 and the path 1. If the correlation between the path 3 and the path 1 is the lowest, the third path may be the path 3.

If the switch 2 is abnormal, the path 2 includes switch 1-switch 2-switch 4-switch 5, the path 3 includes switch 1-switch 6-switch 4-switch 5, and the path 4 includes switch 1-switch 7-switch 4-switch 5, the third path may be the path 3 or the path 4.

If a path that has a lowest correlation with the first path and that does not pass through the abnormal intermediate node is used as the third path, the third path may be the path 3.

Optionally, a path with a smallest delay value may be selected as the third path based on delays respectively corresponding to the path 2 to the path 4.

In this way, when a path is abnormal, the path is switched to a path with a lower correlation for communication, or a faulty node is bypassed, and the path is switched to a path that does not include the faulty node for communication, so that reliability of a plurality of paths between the source node and the destination node can be improved. In addition, a service flow switching speed can be improved, impact of a network fault on a service can be alleviated, and system reliability can be improved.

Figure 6:
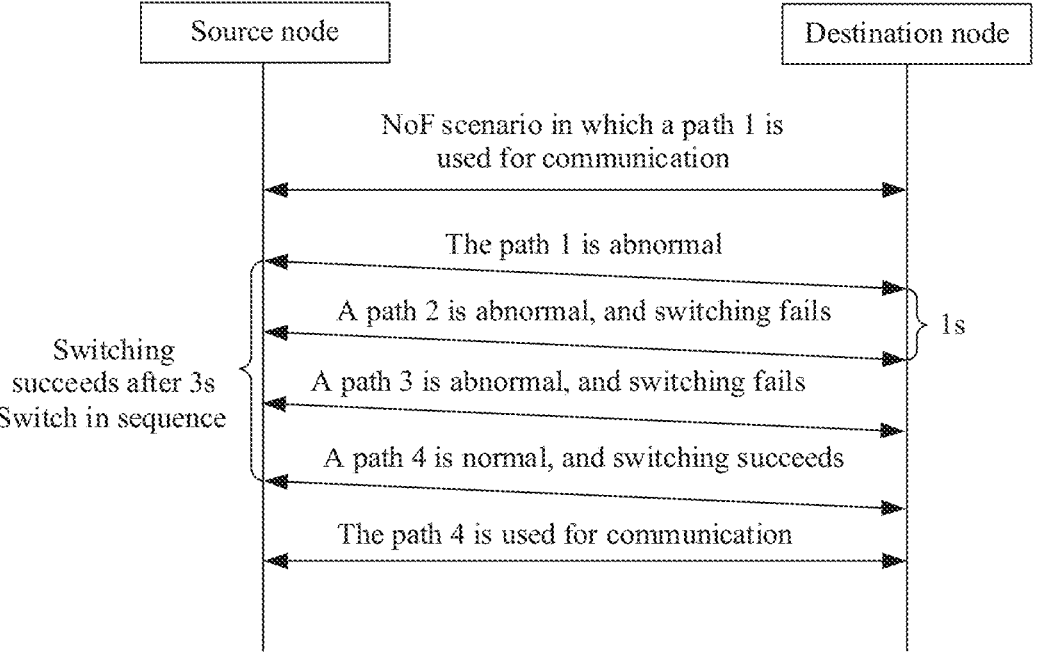
FIG. 6 is a schematic diagram of path switching according to an embodiment of this application.
Figure 7:
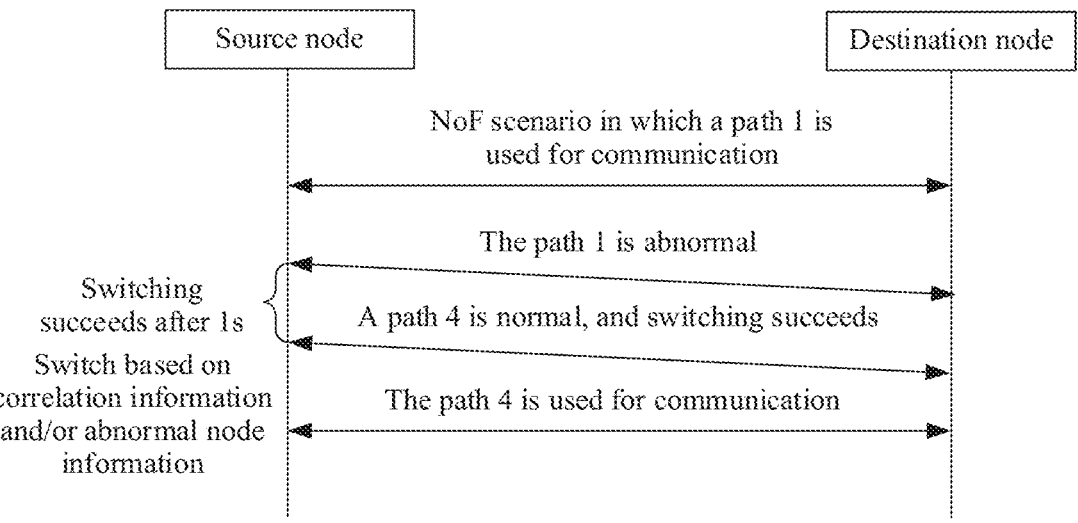
FIG. 7 is another schematic diagram of path switching according to an embodiment of this application.

FIG. 6 and FIG. 7 each are a schematic diagram of path switching according to an embodiment of this application. It is assumed that a path 1 to a path 4 are included between a source node and a destination node, the path 1 is abnormal, the path 1, the path 2, and the path 3 pass through a faulty node, and the path 4 does not pass through the faulty node.

FIG. 6 and FIG. 7 each are a schematic diagram of path switching in a non-volatile memory express over fabric (non-volatile memory express over fabric, NoF) scenario. For example, in the NoF scenario, it takes Is to switch from one path to another path. As shown in FIG. 6, the source node sequentially switches paths; attempts to switch to a path 2 after sensing that a path 1 is abnormal; attempts to switch to a path 3 after sensing that the path 2 is abnormal; and attempts to switch to a path 4 after sensing that the path 3 is abnormal. Switching succeeds if the path 4 is normal. A total of 3 s is required.

As shown in FIG. 7, the source node performs path switching based on correlation information and/or abnormal node information. After sensing that a path 1 is abnormal, the source node determines that a path 4 does not pass through a faulty node, and directly switches to the path 4. A total of 1 s is required, so that consumed time is shorter, and a service flow switching speed is improved.

In this application, unless otherwise specified, for same or similar parts of the embodiments, refer to each other. In embodiments of this application and the implementations/implementation methods in the embodiments, unless otherwise specified or unless a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method based on an internal logical relationship thereof. The following implementations of this application are not intended to limit the protection scope of this application.

The path awareness method provided in embodiments of this application is described in detail above with reference to FIG. 2 to FIG. 7. The path awareness apparatus provided in embodiments of this application is described in detail below with reference to FIG. 8 to FIG. 10.

Figure 8:
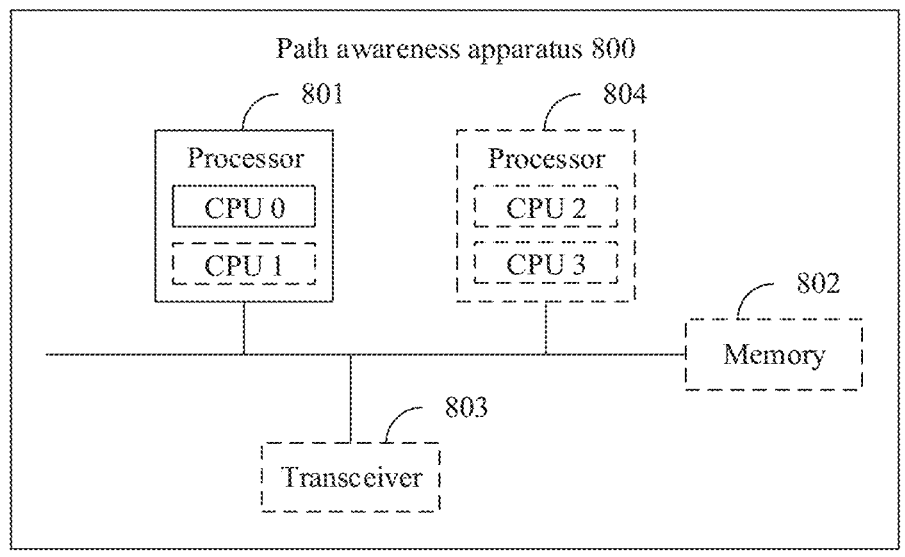
FIG. 8 is a schematic diagram of a structure of a path awareness apparatus according to an embodiment of this application.

FIG. 8 is a schematic diagram of a structure of a path awareness apparatus according to an embodiment of this application. The path awareness apparatus 800 may be a source node, any one of N intermediate nodes, or a destination node, or may be a chip used in a source node, an intermediate node, or a destination node, or another component having a corresponding function. As shown in FIG. 8, the path awareness apparatus 800 may include a processor 801. Optionally, the path awareness apparatus 800 may further include one or more of a memory 802 and a transceiver 803. The processor 801 may be coupled, for example, connected through a communication bus, to one or more of the memory 802 and the transceiver 803, or the processor 801 may be independently used.

The following specifically describes each component of the path awareness apparatus 800 with reference to FIG. 8.

The processor 801 is a control center of the path awareness apparatus 800, and may be one processor, or may be a collective term of a plurality of processing elements. For example, the processor 801 is one or more central processing units (central processing unit, CPU), or may be an application-specific integrated circuit (application-specific integrated circuit, ASIC), or may be one or more integrated circuits configured to implement embodiments of this application, for example, one or more microprocessors (digital signal processor, DSP) or one or more field programmable gate arrays (field programmable gate array, FPGA).

The processor 801 may run or execute a software program stored in the memory 802 and invoke data stored in the memory 802, to perform various functions of the path awareness apparatus 800.

During specific implementation, in an embodiment, the processor 801 may include one or more CPUs, for example, a CPU 0 and a CPU 1 shown in FIG. 8.

During specific implementation, in an embodiment, the path awareness apparatus 800 may alternatively include a plurality of processors, for example, the processor 801 and a processor 804 shown in FIG. 8. Each of the processors may be a single-core processor (single-CPU) or a multi-core processor (multi-CPU). The processor herein may be one or more communication devices, circuits, and/or processing cores configured to process data (for example, computer program instructions).

Optionally, the memory 802 may be a read-only memory (read-only memory, ROM) or another type of static storage communication device capable of storing static information and instructions, or may be a random access memory (random access memory, RAM) or another type of dynamic storage communication device capable of storing information and instructions, or may be an electrically erasable programmable read-only memory (electrically erasable programmable read-only memory, EEPROM), a compact disc read-only memory (compact disc read-only memory, CD-ROM) or other compact disc storage, optical disc storage (including a compressed optical disc, a laser disc, an optical disc, a digital versatile disc, a Blu-ray disc, or the like), a magnetic disk storage medium or another magnetic storage communication device, or any other medium capable of carrying or storing expected program code in a form of an instruction or a data structure and capable of being accessed by a computer. However, this is not limited. The memory 802 may be integrated with the processor 801, or may exist independently and is coupled to the processor 801 by using an input/output port (not shown in FIG. 8) of the path awareness apparatus 800. This is not specifically limited in this embodiment of this application.

For example, the input port may be configured to implement a receiving function performed by the source node, the intermediate node, or the destination node in any one of the foregoing method embodiments, and the output port may be configured to implement a sending function performed by the source node, the intermediate node, or the destination node in any one of the foregoing method embodiments.

The memory 802 may be configured to store a software program for performing the solution in this application, and the processor 801 controls execution. For a specific implementation, refer to the method embodiments. Details are not described herein again.

Optionally, the transceiver 803 is configured to communicate with another path awareness apparatus. For example, when the path awareness apparatus 800 is a source node, the transceiver 803 may be configured to communicate with N intermediate nodes and/or a destination node. For another example, when the path awareness apparatus 800 is an intermediate node, the transceiver 803 may be configured to communicate with a source node, a destination node, and/or another intermediate node. In addition, the transceiver 803 may include a receiver and a transmitter (not separately shown in FIG. 8). The receiver is configured to implement a receiving function, and the transmitter is configured to implement a sending function. The transceiver 803 may be integrated with the processor 801, or may exist independently and is coupled to the processor 801 by using the input/output port (not shown in FIG. 8) of the path awareness apparatus 800. This is not specifically limited in this embodiment of this application.

It should be noted that the structure of the path awareness apparatus 800 shown in FIG. 8 does not constitute a limitation on the path awareness apparatus. An actual path awareness apparatus may include more or fewer components than those shown in the figure, or combine some components, or have different component arrangements.

The processor 801 in the path awareness apparatus 800 shown in FIG. 8 may invoke the application program code stored in the memory 802, to indicate a source node to perform the actions of the source node in FIG. 2 to FIG. 7.

The processor 801 in the path awareness apparatus 800 shown in FIG. 8 may invoke the application program code stored in the memory 802, to indicate an intermediate node to perform the actions of the intermediate node in FIG. 2 to FIG. 7. This is not limited in this embodiment.

The processor 801 in the path awareness apparatus 800 shown in FIG. 8 may invoke the application program code stored in the memory 802, to indicate a destination node to perform the actions of the destination node in FIG. 2 to FIG. 7. This is not limited in this embodiment.

When the path awareness apparatus is a source node, the path awareness apparatus 800 may perform any one or more possible designs related to the source node in the foregoing method embodiments; when the path awareness apparatus is an intermediate node, the path awareness apparatus 800 may perform any one or more possible designs related to the intermediate node in the foregoing method embodiments; or when the path awareness apparatus is a destination node, the path awareness apparatus 800 may perform any one or more possible designs related to the destination node in the foregoing method embodiments.

It should be noted that all related content of each step in the foregoing method embodiment may be cited to a function description of a corresponding function module, and details are not described herein again.

Figure 9:
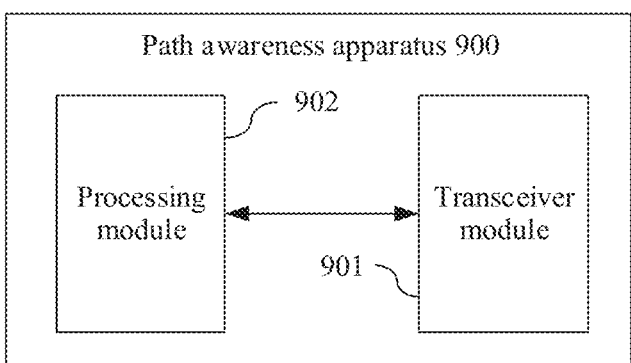
FIG. 9 is a schematic diagram of a structure of another path awareness apparatus according to an embodiment of this application.

FIG. 9 is a schematic diagram of a structure of another path awareness apparatus according to an embodiment of this application. For ease of description, FIG. 9 shows only main components of the path awareness apparatus.

The path awareness apparatus 900 includes a transceiver module 901 and a processing module 902. The path awareness apparatus 900 may be the source node or the intermediate node in the foregoing method embodiments. The transceiver module 901 may also be referred to as a transceiver unit, and is configured to implement sending and receiving functions performed by the source node or the intermediate node in any one of the foregoing method embodiments.

It should be noted that the transceiver module 901 may include a receiving module and a sending module (not shown in FIG. 9). The receiving module is configured to receive data and/or signaling from another device, and the sending module is configured to send data and/or signaling to another device. A specific implementation of the transceiver module is not specifically limited in this application. The transceiver module may include a transceiver circuit, a transceiver machine, a transceiver, or a communication interface.

The processing module 902 may be configured to implement a processing function performed by the source node or the intermediate node in any one of the foregoing method embodiments. The processing module 902 may be a processor.

In this embodiment, the path awareness apparatus 900 is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the path awareness apparatus 900 may be in the form of the path awareness apparatus 800 shown in FIG. 8.

For example, the processor 801 in the path awareness apparatus 800 shown in FIG. 8 may invoke the computer-executable instructions stored in the memory 802, so that the path awareness method in the foregoing method embodiments is performed.

Specifically, a function/an implementation process of the transceiver module 901 and the processing module 902 in FIG. 9 may be implemented by invoking, by the processor 801 in the path awareness apparatus 800 shown in FIG. 8, the computer-executable instructions stored in the memory 802. Alternatively, a function/an implementation process of the processing module 902 in FIG. 9 may be implemented by invoking, by the processor 801 in the path awareness apparatus 800 shown in FIG. 8, the computer-executable instructions stored in the memory 802, and a function/an implementation process of the transceiver module 901 in FIG. 9 may be implemented by using the transceiver 803 in the path awareness apparatus 800 shown in FIG. 8.

Because the path awareness apparatus 900 provided in this embodiment may perform the foregoing path awareness method, for technical effects that can be achieved, refer to the foregoing method embodiments. Details are not described herein again.

Figure 10:
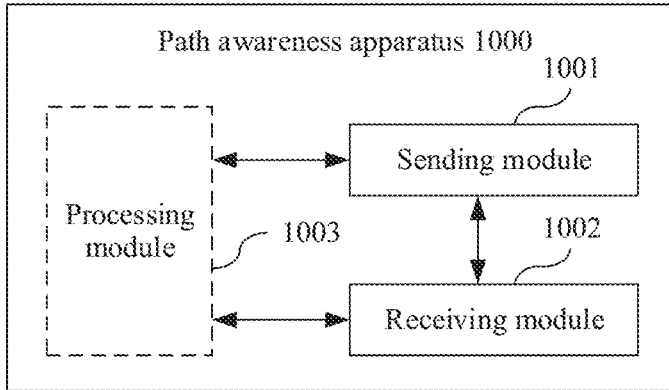
FIG. 10 is a schematic diagram of a structure of another path awareness apparatus according to an embodiment of this application.

FIG. 10 is a schematic diagram of a structure of another path awareness apparatus according to an embodiment of this application. For ease of description, FIG. 10 shows only main components of the path awareness apparatus.

The path awareness apparatus 1000 includes a sending module 1001 and a receiving module 1002. The path awareness apparatus 1000 may be the destination node in the foregoing method embodiments. The sending module 1001 may also be referred to as a sending unit, and is configured to implement a sending function performed by the destination node in any one of the foregoing method embodiments. The receiving module 1002 may also be referred to as a receiving unit, and is configured to implement a receiving function performed by the destination node in any one of the foregoing method embodiments.

It should be noted that the sending module 1001 and the receiving module 1002 may be separately disposed, or may be integrated into one module, that is, a transceiver module. Specific implementations of the receiving module and the sending module are not specifically limited in this application. The transceiver module may include a transceiver circuit, a transceiver machine, a transceiver, or a communication interface.

Optionally, the path awareness apparatus 1000 may further include a processing module 1003 and a storage module. The storage module stores a program or instructions. When the processing module 1003 executes the program or the instructions, the path awareness apparatus 1000 is enabled to perform the method in any one of the foregoing method embodiments.

The processing module 1003 may be configured to implement a processing function performed by the destination node in any one of the foregoing method embodiments. The processing module 1003 may be a processor.

In this embodiment, the path awareness apparatus 1000 is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the path awareness apparatus 1000 may be in the form of the path awareness apparatus 800 shown in FIG. 8.

For example, the processor 801 in the path awareness apparatus 800 shown in FIG. 8 may invoke the computer-executable instructions stored in the memory 802, so that the path awareness method in the foregoing method embodiments is performed.

Specifically, functions/implementation processes of the processing module 1003 and the storage module in FIG. 10 may be implemented by using the transceiver 803 in the path awareness apparatus 800 shown in FIG. 8. A function/an implementation process of the processing module 1003 in FIG. 10 may be implemented by invoking, by the processor 801 in the path awareness apparatus 800 shown in FIG. 8, the computer-executable instructions stored in the memory 802.

Because the path awareness apparatus 1000 provided in this embodiment may perform the foregoing path awareness method, for technical effects that can be achieved, refer to the foregoing method embodiments. Details are not described herein again.

In a possible design solution, the path awareness apparatus 900 shown in FIG. 9 is applicable to the path awareness systems shown in FIG. 1a and FIG. 1b, and performs a function of the source node in any one of the foregoing method embodiments.

The path awareness apparatus 900 is used in a communication network including the path awareness apparatus 900, N intermediate nodes, and a destination node, where N is an integer greater than 0.

The transceiver module 901 is configured to send a first request packet to the destination node. The first request packet includes an identifier of a first node, an identifier of a first data flow, and first reserved information, the first data flow is a data flow between the path awareness apparatus 900 and the destination node, the first data flow is transmitted on a first path, the first request packet is used to request to determine whether the first path passes through the first node, the first node is any one of the N intermediate nodes, and the first reserved information is used to record a result about whether the first path passes through the first node.

The transceiver module 901 is further configured to receive a first response packet from the destination node. The first response packet includes the identifier of the first data flow, the identifier of the first node, and first indication information. The first indication information is obtained by recording, in the first reserved information, the result about whether the first path passes through the first node, and the first indication information indicates that the first path passes through the first node or the first path does not pass through the first node.

The processing module 902 is configured to obtain first information based on the first response packet. The first information includes that the first path passes through the first node or the first path does not pass through the first node.

In a possible design, the first information may further include the identifier of the first data flow and/or a delay of the first path.

In a possible design, the processing module 902 is further configured to determine the first path based on a topology connection relationship and second information. The topology connection relationship may include a topology relationship between the path awareness apparatus 900, the N intermediate nodes, and the destination node, the second information is obtained by iteratively updating the first information based on the first response packet corresponding to the N intermediate nodes, the first path may include a connection relationship between Q first nodes, and Q is an integer greater than 0 and less than or equal to N.

In a possible design, the processing module 902 is further configured to determine a first correlation value. The first correlation value indicates a correlation between the first request packet and a second request packet, the second request packet includes an identifier of a second data flow, the identifier of the first node, and second reserved information, the second data flow is a data flow between the path awareness apparatus 900 and the destination node, the second data flow is transmitted on a second path, the second path is an established path, the second request packet may be used to request to determine whether the second path passes through the first node, and the second reserved information is used to record a result about whether the second path passes through the node.

In a possible design, the transceiver module 901 is further configured to send the first request packet to the destination node when the first correlation value is less than or equal to a correlation threshold.

In a possible design, the processing module 902 is further configured to generate mapping information when the first correlation value is greater than a correlation threshold. The mapping information may include a mapping relationship between the identifier of the second data flow and the identifier of the first data flow.

In a possible design, when the first path is abnormal, the processing module 902 is further configured to switch, based on correlation information and/or abnormal node information, from communicating with the destination node through the first path to communicating with the destination node through a third path. The correlation information may indicate a correlation between each of one or more fourth paths and the first path, paths between the path awareness apparatus 900 and the destination node may include the first path and the one or more fourth paths, and the abnormal node information may indicate an abnormal intermediate node. The third path is a path that is in the one or more fourth paths and that has a lowest correlation with the first path, and/or a path that is in the one or more fourth paths and that does not pass through the abnormal intermediate node.

Optionally, the path awareness apparatus 900 may further include a storage module (not shown in FIG. 9), and the storage module stores a program or instructions. When the processing module 902 executes the program or the instructions, the path awareness apparatus 900 is enabled to perform a function of the source node in any one of the foregoing method embodiments.

It should be noted that the path awareness apparatus 900 may be a source node, or may be a chip (system) or another part or component that can be disposed in a source node. This is not limited in this application.

In addition, for technical effects of the path awareness apparatus 900, refer to the technical effects of the path awareness method in any one of the foregoing method embodiments. Details are not described herein again.

In a possible design solution, the path awareness apparatus 900 shown in FIG. 9 is applicable to the path awareness systems shown in FIG. 1a and FIG. 1b, and performs a function of the intermediate node in the path awareness method in any one of the foregoing method embodiments.

The path awareness apparatus 900 is used in a communication network including a source node, N intermediate nodes, and a destination node, where N is an integer greater than 0. The path awareness apparatus 900 is any one of the N intermediate nodes.

The transceiver module 901 is configured to receive a first request packet. The first request packet includes an identifier of a first node, an identifier of a first data flow, and first reserved information, the first data flow is a data flow between the source node and the destination node, the first data flow is transmitted on a first path, the first request packet is used to request to determine whether the first path passes through the first node, and the first reserved information is used to record a result about whether the first path passes through the first node.

The processing module 902 is configured to determine whether the first path passes through the first node.

The transceiver module 901 is further configured to send a third request packet. The third request packet includes the identifier of the first data flow, the identifier of the first node, and first indication information, the first indication information is obtained by recording, in the first reserved information, the result about whether the first path passes through the first node, and the first indication information indicates that the first path passes through the first node or the first path does not pass through the first node.

It should be noted that all related content of each step in the foregoing method embodiment may be cited to a function description of a corresponding function module, and details are not described herein again.

Optionally, the path awareness apparatus 900 may further include a storage module (not shown in FIG. 9), and the storage module stores a program or instructions. When the processing module 902 executes the program or the instructions, the path awareness apparatus 900 is enabled to perform a function of the intermediate node in any one of the foregoing method embodiments.

It should be noted that the path awareness apparatus 900 may be an intermediate node, or may be a chip (system) or another part or component that can be disposed in an intermediate node. This is not limited in this application.

In addition, for technical effects of the path awareness apparatus 900, refer to the technical effects of the path awareness method in any one of the foregoing method embodiments. Details are not described herein again.

In another possible design solution, the path awareness apparatus 1000 shown in FIG. 10 is applicable to the path awareness systems shown in FIG. 1a and FIG. 1b, and performs a function of the destination node in the path awareness method in any one of the foregoing method embodiments.

The path awareness apparatus 1000 is used in a communication network including a source node, N intermediate nodes, and the path awareness apparatus 1000, where N is an integer greater than 0.

The receiving module 1002 is configured to receive a third request packet. The third request packet includes an identifier of a first data flow, an identifier of a first node, and first indication information, and the first indication information indicates that a first path passes through the first node or a first path does not pass through the first node. The first data flow is a data flow between the source node and the path awareness apparatus 1000, the first data flow is transmitted on the first path, and the first node is any one of the N intermediate nodes.

The sending module 1001 is configured to send a first response packet to the source node based on the identifier of the first data flow. The first response packet includes the identifier of the first data flow, the identifier of the first node, and the first indication information, and the first indication information indicates that the first path passes through the first node or the first path does not pass through the first node.

It should be noted that all related content of each step in the foregoing method embodiment may be cited to a function description of a corresponding function module, and details are not described herein again.

Optionally, the path awareness apparatus 1000 may further include a storage module (not shown in FIG. 10), and the storage module stores a program or instructions. When the processing module 1003 executes the program or the instructions, the path awareness apparatus 1000 is enabled to perform a function of the destination node in any one of the foregoing method embodiments.

It should be noted that the path awareness apparatus 1000 may be a destination node, or may be a chip (system) or another part or component that can be disposed in a destination node. This is not limited in this application.

In addition, for technical effects of the path awareness apparatus 1000, refer to the technical effects of the path awareness method in any one of the foregoing method embodiments. Details are not described herein again.

An embodiment of this application provides a path awareness system. The path awareness system includes a source node, N intermediate nodes, and a destination node, where N is an integer greater than 0. The source node is configured to perform the actions of the source node in the foregoing method embodiments, the N intermediate nodes are configured to perform the actions of the intermediate node in the foregoing method embodiments, and the destination node is configured to perform the actions of the destination node in the foregoing method embodiments. For a specific execution method and process, refer to the foregoing method embodiments. Details are not described herein again.

An embodiment of this application provides a chip system. The chip system includes a logic circuit and an input/output port. The logic circuit may be configured to implement a processing function related to the path awareness method provided in embodiments of this application, and the input/output port may be configured to implement sending and receiving functions related to the path awareness method provided in embodiments of this application.

For example, the input port may be configured to implement the receiving function related to the path awareness method provided in embodiments of this application, and the output port may be configured to implement the sending function related to the path awareness method provided in embodiments of this application.

For example, the processor in the path awareness apparatus 800 may be configured to perform, for example, but not limited to, baseband-related processing, and the transceiver in the path awareness apparatus 800 may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor may be integrated on a same chip as a plurality of application processors (for example, but not limited to a graphics processing unit and a multimedia processor). The chip may be referred to as a system on a chip (system on a chip). Whether components are independently disposed on different chips or are integrated and disposed on one or more chips usually depends on specific requirements of a product design. Specific implementation forms of the foregoing components are not limited in embodiments of the present invention.

In a possible design, the chip system further includes a memory. The memory is configured to store program instructions and data for implementing a function related to the path awareness method provided in embodiments of this application.

The chip system may include a chip, or may include a chip and another discrete component.

An embodiment of this application provides a computer-readable storage medium. The computer-readable storage medium stores a computer program or instructions. When the computer program or the instructions is/are run on a computer, the path awareness method provided in embodiments of this application is performed.

An embodiment of this application provides a computer program product. The computer program product includes a computer program or instructions. When the computer program or the instructions is/are run on a computer, the path awareness method provided in embodiments of this application is performed.

It should be understood that, the processor in embodiments of this application may be a central processing unit (central processing unit, CPU). The processor may alternatively be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through an example rather than a limitative description, random access memories (random access memory, RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch-link dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When software is used to implement embodiments, the foregoing embodiments may be implemented completely or partially in a form of a computer program product. The computer program product includes one or more computer instructions or computer programs. When the computer instructions or computer programs are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including a single item (piece) or any combination of a plurality of items (pieces). For example, at least one of a, b, or c may represent a, b, c, a and b, a and c, b and c, or a, b, and c, where a, b, and c may be singular or plural.

It should be understood that in embodiments of this application, sequence numbers of processes do not mean a sequence of execution. The sequence of execution of the processes should be determined according to functions and internal logic of the processes, and should not constitute any limitation on an implementation process of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are implemented by hardware or software depends on specific applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to a source node in a communication network, wherein the communication network comprises the source node, a plurality of intermediate nodes, and a destination node, and the method comprises:

sending a first request packet to the destination node, wherein the first request packet comprises an identifier of a first node, an identifier of a first data flow, and first reserved information, wherein the first data flow is a data flow between the source node and the destination node, the first data flow is transmitted on a first path, the first request packet requests to determine whether the first path passes through the first node, and the first node is an intermediate node of the plurality of intermediate nodes;

receiving a first response packet from the destination node, wherein the first response packet comprises the identifier of the first data flow, the identifier of the first node, and first indication information, the first indication information is obtained by recording, in the first reserved information, a result about whether the first path passes through the first node, and the first indication information indicates that the first path passes through the first node or indicates that the first path does not pass through the first node; and obtaining first information based on the first response packet, wherein the first information comprises information that the first path passes through the first node or the first path does not pass through the first node.

2. The method according to claim 1, wherein the first information further comprises the identifier of the first data flow or a delay of the first path.

3. The method according to claim 1, further comprising:
determining the first path based on a topology connection relationship and second information, wherein the topology connection relationship comprises a topology relationship between the source node, the plurality of intermediate nodes, and the destination node, the second information is obtained by iteratively updating the first information based on one or more response packets corresponding to the plurality of intermediate nodes, and the first path comprises a connection relationship between Q intermediate nodes, wherein Q is an integer greater than 0 and less than or equal to a quantity of the plurality of intermediate nodes.

4. The method according to claim 1, further comprising:
determining a first correlation value, wherein the first correlation value indicates a correlation between the first request packet and a second request packet, the second request packet comprises an identifier of a second data flow, the identifier of the first node, and second reserved information, the second data flow is a data flow between the source node and the destination node, the second data flow is transmitted on a second path, the second request packet is a sent packet, the second request packet requests to determine whether the second path passes through the first node, and the second reserved information is used to record a result about whether the second path passes through the first node.

5. The method according to claim 4, wherein sending the first request packet to the destination node comprises:
sending the first request packet to the destination node when the first correlation value is less than or equal to a correlation threshold.

6. The method according to claim 4, further comprising:
generating mapping information when the first correlation value is greater than a correlation threshold, wherein the mapping information comprises a mapping relationship between the identifier of the second data flow and the identifier of the first data flow.

7. The method according to claim 1, further comprising:
when the first path is abnormal, switching, based on correlation information or abnormal node information, from communicating with the destination node through the first path to communicating with the destination node through a third path, wherein the correlation information indicates a correlation between each of one or more fourth paths and the first path, paths between the source node and the destination node comprise the first path and the one or more fourth paths, the abnormal node information indicates an abnormal intermediate node, and the third path is a path that is in the one or more fourth paths and that has a lowest correlation with the first path, or a path that is in the one or more fourth paths and that does not pass through the abnormal intermediate node.

8. An apparatus, used in a communication network comprising the apparatus, a plurality of intermediate nodes, and a destination node, wherein the apparatus comprises:
at least one processor;
a memory storing program instructions, which, when executed by the at least one processor, cause the apparatus to:
send a first request packet to the destination node, wherein the first request packet comprises an identifier of a first node, an identifier of a first data flow, and first reserved information, wherein the first data flow is a data flow between the apparatus and the destination node, the first data flow is transmitted on a first path, the first request packet requests to determine whether the first path passes through the first node, the first node is an intermediate node of the plurality of intermediate nodes;
receive a first response packet from the destination node, wherein the first response packet comprises the identifier of the first data flow, the identifier of the first node, and first indication information, wherein the first indication information is obtained by recording, in the first reserved information, a result about whether the first path passes through the first node, and the first indication information indicates that the first path passes through the first node or indicates that the first path does not pass through the first node; and
obtain first information based on the first response packet, wherein the first information comprises information that the first path passes through the first node or the first path does not pass through the first node.

9. The apparatus according to claim 8, wherein the first information further comprises the identifier of the first data flow or a delay of the first path.

10. The apparatus according to claim 8, wherein the program instructions, when executed by the at least one processor, further cause the apparatus to:
determine the first path based on a topology connection relationship and second information, wherein the topology connection relationship comprises a topology relationship between the apparatus, the plurality of intermediate nodes, and the destination node, wherein the second information is obtained by iteratively updating the first information based on the first response packet corresponding to the plurality of intermediate nodes, and the first path comprises a connection relationship between Q intermediate nodes, and wherein Q is an integer greater than 0 and less than a quantity of the plurality of intermediate nodes.

11. The apparatus according to claim 8, wherein the program instructions, when executed by the at least one processor, further cause the apparatus to:
determine a first correlation value, wherein the first correlation value indicates a correlation between the first request packet and a second request packet, the second request packet comprises an identifier of a second data flow, the identifier of the first node, and second reserved information, wherein the second data flow is a data flow between the apparatus and the destination node, the second data flow is transmitted on a second path, the second path is an established path, the second request packet requests to determine whether the second path passes through the first node, and the second reserved information is used to record a result about whether the second path passes through the first node.

12. The apparatus according to claim 11, wherein the program instructions, when executed by the at least one processor, further cause the apparatus to:

send the first request packet to the destination node when the first correlation value is less than or equal to a correlation threshold.

13. The apparatus according to claim 11, wherein the program instructions, when executed by the at least one processor, further cause the apparatus to:

generate mapping information when the first correlation value is greater than a correlation threshold, wherein the mapping information comprises a mapping relationship between the identifier of the second data flow and the identifier of the first data flow.

14. The apparatus according to claim 8, wherein the program instructions, when executed by the at least one processor, further cause the apparatus to:

when the first path is abnormal, switch, based on correlation information or abnormal node information, from communicating with the destination node through the first path to communicating with the destination node through a third path, wherein the correlation information indicates a correlation between each of a plurality of fourth paths and the first path, paths between the apparatus and the destination node comprise the first path and the plurality of fourth paths, the abnormal node information indicates an abnormal intermediate node, and the third path is a path that is in the plurality of fourth paths and that has a lowest correlation with the first path, or a path that is in the plurality of fourth paths and that does not pass through the abnormal intermediate node.

15. An apparatus, used in a communication network comprising a source node, a plurality of intermediate nodes, and a destination node, wherein the apparatus is an intermediate node of the plurality of intermediate nodes, and the apparatus comprises:

at least one processor;

a memory storing program instructions, which, when executed by the at least one processor, cause the apparatus to:

receive a first request packet, wherein the first request packet comprises an identifier of a first node, an identifier of a first data flow, and first reserved information, wherein the first data flow is a data flow between the source node and the destination node, the first data flow is transmitted on a first path, the first request packet requests the first node to determine whether the first path passes through the first node, and the first node is an intermediate node of the plurality of intermediate nodes;

determine whether the first path passes through the first node; and send a second request packet, wherein the second request packet comprises the identifier of the first data flow, the identifier of the first node, and first indication information, wherein the first indication information is obtained by recording, in the first reserved information, a result about whether the first path passes through the first node, and the first indication information indicates that the first path passes through the first node or indicates that the first path does not pass through the first node.

16. The apparatus according to claim 15, wherein the first reserved information further comprises the identifier of the first data flow or a delay of the first path.

17. The apparatus according to claim 15, wherein the program instructions, when executed by the at least one processor, further cause the apparatus to:

determine, based on whether an identifier of the apparatus matches the identifier of the first node in the first request packet, whether the first path passes through the first node.

18. The apparatus according to claim 17, wherein the first reserved information is used to record the result about the first path passing through the first node in accordance with the identifier of the apparatus matching the identifier of the first node.

19. The apparatus according to claim 17, wherein the first reserved information is used to record the result about the first path not passing through the first node in accordance with the identifier of the apparatus not matching the identifier of the first node.

20. An apparatus, used in a communication network comprising a source node, a plurality of intermediate nodes, and the apparatus, wherein the apparatus comprises:

at least one processor;

a memory storing program instructions, which, when executed by the at least one processor, cause the apparatus to:

receive a second request packet, wherein the second request packet comprises an identifier of a first data flow, an identifier of a first node, and first indication information, wherein the first indication information indicates that a first path passes through the first node or a first path does not pass through the first node, the first data flow is a data flow between the source node and the apparatus, the first data flow is transmitted on the first path, and the first node is an intermediate node of the plurality of intermediate nodes; and send a first response packet to the source node based on the identifier of the first data flow, wherein the first response packet comprises the identifier of the first data flow, the identifier of the first node, and the first indication information, and wherein the first indication information indicates that the first path passes through the first node or the first path does not pass through the first node.

* * * * *